United States Patent
Päivinen et al.

(10) Patent No.: US 11,959,551 B2
(45) Date of Patent: Apr. 16, 2024

(54) METHOD OF OPERATING A SEALING MONITORING SYSTEM AND A SEALING MONITORING SYSTEM FOR A SEAL

(71) Applicant: Sulzer Management AG, Winterthur (CH)

(72) Inventors: Timo Päivinen, Taavetti (FI); Janne Ripattila, Kouvola (FI); Juha Hienonen, Kotka (FI)

(73) Assignee: SULZER MANAGEMENT AG, Winterthur (CH)

( * ) Notice: Subject to any disclaimer, the term of this patent is extended or adjusted under 35 U.S.C. 154(b) by 363 days.

(21) Appl. No.: 17/612,328

(22) PCT Filed: May 5, 2020

(86) PCT No.: PCT/EP2020/062459
§ 371 (c)(1),
(2) Date: Nov. 18, 2021

(87) PCT Pub. No.: WO2020/249316
PCT Pub. Date: Dec. 17, 2020

(65) Prior Publication Data
US 2022/0260159 A1  Aug. 18, 2022

(30) Foreign Application Priority Data

Jun. 12, 2019  (EP) ..................................... 19179796

(51) Int. Cl.
*G01M 3/04* (2006.01)
*F16J 15/34* (2006.01)
*G08B 21/18* (2006.01)

(52) U.S. Cl.
CPC ........... *F16J 15/3492* (2013.01); *G01M 3/04* (2013.01); *G08B 21/187* (2013.01)

(58) Field of Classification Search
CPC .............................. F16J 15/3492; G01M 3/04
See application file for complete search history.

(56) References Cited

U.S. PATENT DOCUMENTS 5,755,372 A * 5/1998 Cimbura, Sr. .......... E21B 33/08
                                                          277/318
6,065,345 A    5/2000 Holenstein et al.
(Continued)

FOREIGN PATENT DOCUMENTS

EP    1510698 A2   3/2005
EP    3139072 A1   3/2017
(Continued)

OTHER PUBLICATIONS

International Search Report and Written Opinion dated May 20, 2020 in corresponding International Patent Application No. PCT/EP2020/062459, filed May 5, 2020.

*Primary Examiner* — Eric S. McCall
(74) *Attorney, Agent, or Firm* — GLOBAL IP COUNSELORS, LLP

(57) ABSTRACT

A method of operating a sealing monitoring system for a seal of a rotatable shaft including a flushing liquid system, the seal disposed between the rotatable shaft and a stationary housing. The sealing monitoring system includes a liquid detector to detect a presence of a flushing liquid in the flushing liquid system. The method includes detecting the flushing liquid presence status in the flushing liquid system with the liquid detector, and when the flushing liquid presence status is affirmative, transmitting the flushing liquid presence status for processing using a wireless data communication system with a first data transmission interval between the transmissions, and when the flushing liquid presence status is negative, transmitting the flushing liquid presence status for processing using the wireless data com- (Continued)

munication system with a second data transmission interval being shorter than the first transmission interval between the transmissions.

15 Claims, 5 Drawing Sheets

(56) References Cited

U.S. PATENT DOCUMENTS

| | | | |
|---|---|---|---|
| 6,360,610 B1 | 3/2002 | Jarzynski et al. | |
| 2003/0015840 A1* | 1/2003 | Davis | G01M 3/2869 277/320 |
| 2014/0097573 A1* | 4/2014 | Zentic | F16J 15/3404 277/401 |
| 2018/0372226 A1* | 12/2018 | Hauske | F16J 15/3492 |
| 2021/0324957 A1* | 10/2021 | Posa | F16J 15/3492 |

FOREIGN PATENT DOCUMENTS

| | | |
|---|---|---|
| MX | 2011003615 A | 8/2011 |
| WO | 2018210504 A1 | 11/2018 |

\* cited by examiner

METHOD OF OPERATING A SEALING MONITORING SYSTEM AND A SEALING MONITORING SYSTEM FOR A SEAL

CROSS-REFERENCE TO RELATED APPLICATION

This application is a U.S. National Stage application of International Application No. PCT/EP2020/062459, filed May 5, 2020, which claims priority to European Patent Application No. 19179796.8, filed Jun. 12, 2019, the contents of each of which are hereby incorporated herein by reference.

BACKGROUND

Field of the Invention

The present disclosure relates to method of operating a sealing monitoring system for a seal of a rotatable shaft. The present disclosure also relates to a sealing monitoring system for a seal in connection with a rotatable shaft comprising a flushing liquid system, the seal being arranged between a rotatable shaft and a seal housing.

Background Information

Mechanical seals are gaining more and more acceptance in various shaft sealing applications. The mechanical seals find use in various pumps, mixers and agitators. Mechanical seals are of relatively simple construction, they endure high temperatures and their maintenance and service is relatively easy. But, just like all kinds of seals, their lifetime is hard to predict. It is also quite impossible to perform any visual monitoring of the condition of the seal. Failure of such seals may cause considerable damages and extra costs. Therefore, prior art includes numerous documents that discuss the monitoring of the condition of a mechanical seal.

EP3139072 A1 discloses an apparatus for monitoring one or more components of a propulsion system of a watercraft. Plurality of sensors are arranged to a mechanical seal of a propeller shaft and information obtained by the sensors is sent to a controller which is configured to provide estimated residual lifetime of the mechanical seal device.

WO2018210504 A1 discloses a mechanical seal having a rotary part and a non-rotary part, the rotary part having at least a rotary slide ring and a rotary slide ring carrier, and the non-rotary part having at least a non-rotary slide ring and a non-rotary slide ring carrier. The mechanical seal is provided with a circumferential groove in one of the rotary slide ring and the non-rotary slide ring and a sensor in communication with the mechanical seal.

U.S. Pat. No. 6,065,345 A discusses a method of monitoring the condition of a mechanical seal in an apparatus provided with a rotating part, in particular in a pump, which has a rotating shaft for the forwarding of a fluid. The sound emission of the seal is continually measured at discrete times in the operating state of the apparatus and at least one statistical characteristic value is won from the acoustic signals. The goal in the above discussed patent is to monitor the sliding condition of the seal. In other words, if the seal is starting to run dry, i.e. the flushing is, for some reason, not working properly, the acoustic emission from the seal changes with the condition of the lubricating film.

U.S. Pat. No. 6,360,610 B1 discusses a system and a method that are particularly suited for monitoring the interface of two liquid lubricated mechanical seal faces. The system monitors an interface by using a wave source to produce an ultrasonic shear wave, directing the wave at the interface, detecting the wave after it interacts with the interface, and comparing the detected wave to predetermined wave characteristics. Based on the comparison, an alarm may be triggered.

EP 1510698 B1 discloses a pump that includes a device for protecting the pump against dry running. The pump includes a sensor by which a filling level at a region of a mechanical seal is detected and starting of the pump can be prevented if liquid is not detected.

It is also known as such to monitor mechanical seals making use of wireless monitoring systems. As an example of such it is referred to a publication MX 2011003615 A which discloses e.g., gathering lubrication information of a mechanical seal and vibration information of the device by a wireless data transfer system.

SUMMARY

However, there is still a need of further improve the reliability of the operation of a mechanical seal.

An object of embodiments of the invention is to provide a method of operating a sealing monitoring system in a mechanical seal of a rotatable shaft, in which performance is considerably improved compared to the prior art solutions.

It is also an object of embodiments of the invention to provide a sealing monitoring system which is considerably improved compared to the prior art solutions.

Objects of embodiments of the invention can be met substantially as is disclosed here which describe details of different embodiments of the invention.

According to an embodiment of the invention, a method of operating a sealing monitoring system in a seal of a rotatable shaft comprising a seal including a flushing liquid system between a rotatable shaft and a stationary housing, a first liquid detector configured to detect presence of flushing liquid in the flushing liquid system, the method comprising detecting a first flushing liquid presence status in the flushing liquid system by the first liquid detector, and
a) when the first flushing liquid presence status is affirmative, transmitting the first flushing liquid presence status to a further processing using a wireless data communication system with a first data transmission interval between the transmissions, and
b) when the first flushing liquid presence status is negative, transmitting the first flushing liquid presence status for further processing using the wireless data communication system with a second data transmission interval being shorter than the first transmission interval between the transmissions.

By embodiments of the invention it is possible to obtain the information of status of the flushing liquid, and particularly possible failure of the seal in a device including the rotatable shaft, even at remote or unmanned locations practically in real time, and over a long period of time due to the practise that the data transmission interval is changed based on the flushing liquid presence status and unnecessary energy consumption can be minimized.

According to an embodiment of the invention the first liquid detector detects the presence status of the liquid intermittently, and when the first flushing liquid presence status is affirmative the first flushing liquid presence status of the flushing liquid system is detected using a first detecting interval, and when the first flushing liquid presence status is negative the first flushing liquid presence status of the flushing liquid system is detecting using a second detecting interval that is shorter than the first detecting interval.

This way providing a break between the transmissions and/or when the interval between the transmissions is changed based on the presence of the flushing liquid the sealing monitoring system uses only minimal amount of energy and thus its independency is at high level.

According to an embodiment of the invention the first liquid detector detects the presence status of the liquid continuously.

According to an embodiment of the invention when the first flushing liquid presence status is affirmative the wireless data communication system is set to idle between the data transmissions.

According to an embodiment of the invention when the first flushing liquid presence status is affirmative the first data transmission interval is more than one hour.

According to an embodiment of the invention when the first flushing liquid presence status is affirmative the first data transmission interval is more than 4 hours.

According to an embodiment of the invention when the first flushing liquid presence status is affirmative the first data transmission interval is infinite. In this embodiment the first flushing liquid presence status is transmitted to a further processing only when the first flushing liquid presence status is negative again.

According to an embodiment of the invention when the first flushing liquid presence status is negative the second data transmission interval is less than 60 seconds.

According to an embodiment of the invention the sealing monitoring system includes a vibration sensor unit, and the method comprises detecting vibration information of the shaft of the device, and determining the rotation status of the shaft from the vibration information, and when the first flushing liquid presence status is affirmative transmitting the vibration information for further processing using the first data transmission interval between the transmissions, when the first flushing liquid presence status is negative, transmitting the vibration information for further processing using the second data transmission interval between the transmissions.

According to an embodiment of the invention the sealing monitoring system includes a vibration sensor unit, and the method comprises detecting vibration information of the shaft of the device, and determining rotation status of the shaft from the vibration information and when the first flushing liquid presence status is affirmative, transmitting the vibration information for further processing using the first data transmission interval between the transmissions, when the first flushing liquid presence status is negative transmitting the vibration information for further processing using the second data transmission interval between the transmissions and decreasing the interval of detecting vibration information of the shaft of the device.

According to an embodiment of the invention, the vibration information is used for determining if the shaft is rotating or not. When the first flushing liquid presence status is negative, the vibration information is used to determine if the shaft is rotating or not and if the shaft is rotating, the first flushing liquid presence status is transmitted for further processing using the wireless data communication system with a second data transmission interval is shorter than the first transmission interval between the transmissions.

According to an embodiment of the invention, when the first flushing liquid presence status is affirmative, transmitting the first flushing liquid presence status to a further processing using a wireless data communication system with a first data transmission interval between the transmissions, and detecting the transmission occurrence and when the transmission occurrence cannot be positively confirmed, triggering an alarm signal. When the first data transmission interval is stored or made available for use in a transmission receiving unit, the omission of transmission within the interval can be used to detect a problem in the transmission procedure. This way it is possible to actively monitor for example the charge of a battery providing power to the wireless data communication system.

According to an embodiment of the invention the sealing monitoring system includes a vibration sensor unit, and the method comprises detecting a start moment of the device and defining the first flushing liquid presence status at the start moment of the device, and when the first flushing liquid presence status is negative, transmitting an anomaly message for further processing, the anomaly message comprising information that the seal is running dry.

According to an embodiment of the invention the flushing liquid system comprises a node to which the first flushing liquid presence status is transmitted using a wireless data communication system and the first flushing liquid presence status is transmitted from the node further processing using the wireless data communication system. More generally all the sensors of the sealing monitoring system are arranged to communicate with the node which transmits the communicated data for further processing via the internet.

Embodiments of the invention also relate to a sealing monitoring system for a seal in an apparatus comprising a rotatable shaft, a flushing liquid system, the sealing being arranged between the rotatable shaft and a housing, wherein the sealing monitoring system comprises a first liquid detector configured to detect the presence of flushing liquid in the flushing liquid system, a data processing apparatus which is configured to receive data of the first liquid detector and a wireless data communication system in data transfer connection with the data processing apparatus, and wherein the data processing apparatus comprises executable instructions to detect the first flushing liquid presence status of the flushing liquid system, executable instructions to determine the first flushing liquid presence status to be either affirmative when the presence of the flushing liquid in the flushing liquid system is detected, or negative when the presence of the flushing liquid in the flushing liquid system is not detected, executable instructions to transmit the first flushing liquid presence status for further processing using the wireless data communication system with a first data transmission interval when the flushing liquid presence status is affirmative, and executable instructions to transmit the first flushing liquid presence status for further processing using the wireless data communication system with a second data transmission interval being shorter than the first transmission interval between the transmissions, when the flushing liquid presence status is negative.

According to an embodiment of the invention the first flushing liquid presence status, a second flushing liquid presence status and/or the vibration status is transferred to a remote data server, which makes it possible to utilize the data for various purposes.

According to an embodiment of the first liquid detector is configured to detect presence of flushing liquid intermittently and the data processing apparatus comprises executable instructions to detect the first flushing liquid presence status using the first detecting interval in case the first flushing liquid presence status is affirmative, and executable instructions to detect the first flushing liquid presence status using a second detecting interval being shorter than the first detecting interval in case the first flushing liquid presence status is negative. According to an embodiment of the invention the first liquid detector is configured to detect the presence of flushing liquid continuously.

According to an embodiment of the invention the data processing apparatus comprises executable instructions to set the wireless data communication system to idle between the transmissions.

According to an embodiment of the invention the data processing apparatus comprises executable instructions to transmit the first flushing liquid presence status for further processing using the wireless data communication system with the first data transmission interval being more than one hour in case the flushing liquid presence status is affirmative.

According to an embodiment of the invention the data processing apparatus comprises executable instructions to transmit the first flushing liquid presence status with the first data transmission interval being more than 4 hours when the flushing liquid presence status is affirmative.

According to an embodiment of the invention the data processing apparatus comprises executable instructions to transmit the first flushing liquid presence status with the first data transmission interval being infinite when the flushing liquid presence status is affirmative.

According to an embodiment of the invention the data processing apparatus comprises executable instructions to set the second data transmission interval to less than 60 seconds.

According to an embodiment of the invention the sealing monitoring system comprises a node which is configured to communicate with a gateway to the internet, and the first liquid detector is configured to communicate with the node. Advantageously the node is a standalone device off the mains power grid, which node includes dedicated power accumulator providing power to operate any power consumers in the node over a period of time more than 1 month.

According to an embodiment of the invention the sealing monitoring system comprises a second liquid detector configured to detect the presence of liquid outside the flushing liquid system and the second liquid detector is configured to communicate with the node and the node which is configured to communicate with a gateway to the internet and transfer the data obtained by the first liquid detector and the second liquid detector to the gateway.

According to an embodiment of the invention the sealing monitoring system comprises a second liquid detector configured to detect presence of liquid outside the flushing liquid system, and the data processing apparatus is configured to receive data of the second liquid detector, wherein the data processing apparatus further comprises executable instructions to detect the second flushing liquid presence status outside the flushing liquid system, executable instructions to determine the second flushing liquid presence status to be either affirmative when the presence of the flushing liquid out-side the flushing liquid system is detected, or negative when the presence of the flushing liquid outside the flushing liquid system is not detected, and executable instructions to transmit the second flushing liquid presence status for further processing using the wireless data communication system with the second data transmission interval in case the second flushing liquid presence status is affirmative.

A data processing apparatus is a computer processor that incorporates the functions of a central processing unit on one or more integrated circuits (IC). The data processing apparatus is a clock driven, register based, digital integrated circuit that accepts binary data as input, processes it according to instructions stored in its memory, and provides results as output.

It is possible to obtain various advantageous effects and functionalities. For example the device provided with the seal can be monitored efficiently in remote places. The sealing monitoring system according to embodiments of the invention makes it also possible to provide multiple devices at even a remote site with efficient monitoring in a straightforward and economical manner.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in the claims are mutually freely combinable unless otherwise explicitly stated. The novel features which are considered as characteristic of the invention are set forth in particular in the appended claims.

The liquid detectors are known as such for a skilled person in the art. There are many principles known which can be used for detecting the presence of a liquid, which are based on making use occurrences of optical, ultrasonic, float, capacitance, radar or conductivity or resistance nature depending on the presence or absence of the liquid.

BRIEF DESCRIPTION OF DRAWINGS

The invention will be explained in more detail hereinafter with reference to the drawings.

DETAILED DESCRIPTION

Figure 1:
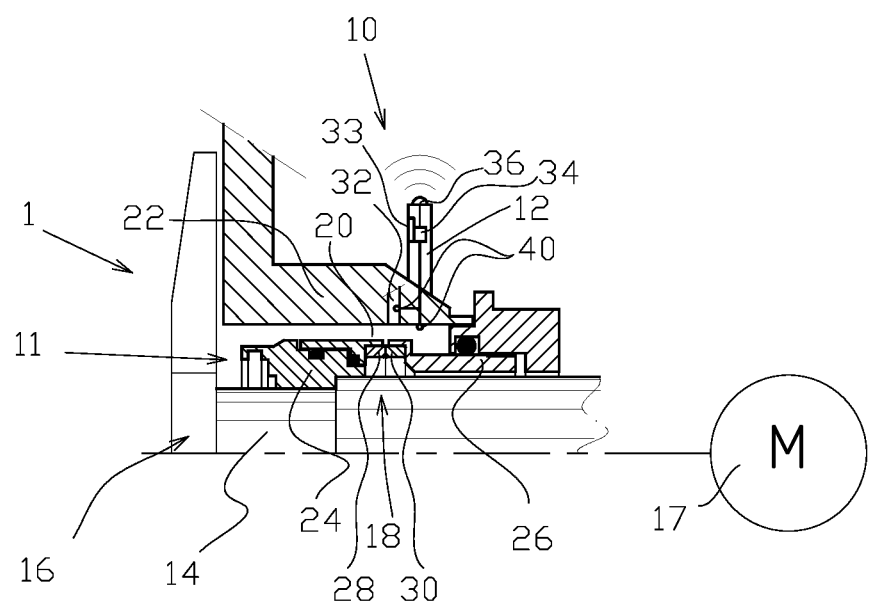
FIG. 1 illustrates a sealing monitoring system for a mechanical seal according to an embodiment of the invention.

FIG. 1 schematically depicts a device 1, or relevant parts of it, in which a shaft 14 is rotatably supported in a body 22, and a mechanical seal 11 is arranged to the rotatably supported shaft 14. The shaft and the device are run by a motor 17 coupled to the shaft 14 so as to seal an inner side of the device from an outer side of the device. In the embodiment of FIG. 1 the seal 18 comprises a rotary part 24 and a non-rotary part 26. The rotary part 24 in FIG. 1 comprises a retainer ring, a rotary slide ring carrier and a rotary slide ring 28. The rotary slide ring 18 is attached to an axial end of the rotary slide ring carrier. The non-rotary part 26 comprises a non-rotary slide ring carrier, a non-rotary slide ring 30 and a gland ring. The non-rotary slide ring 30 is attached to an end of the non-rotary slide ring carrier. The slide rings 28 and 30 are, when in use in the flow machine, in mechanical contact with one another. In addition to the components shown in FIG. 1 the mechanical seal 11 can comprise O-rings, drive pins, set screws and bolts, but as they do not relate to explaining the embodiments of the present invention they have not been discussed in any more detail. The contact surface between the rotary slide ring 28 and the non-rotary slide ring 30 act as a primary seal of the mechanical seal 18. The seal 11 is described herein mainly for the purpose of understanding the sealing monitoring system 10 and it can be constructed in various manners.

The mechanical seal 11 of the device 1 includes a flushing liquid system 32. In FIG. 1 the flushing liquid system 32 is shown generally as a partial conduit opening into the seal chamber 20 indicating that flushing can be implemented in various ways known as such to a skilled person in the art. In some embodiments the flushing liquid can be for example process liquid which the device, such as a pump, is arranged to handle. The purpose of the flushing liquid system is to circulate fluid to or from the seal chamber 20 in order to maintain proper lubrication, pressure, temperature, and solids management. The goal is to create an ideal work environment for the seal 11 in order to minimize wear and failures, thus prolonging its useful life. Any liquid available and fitting to the purpose can be used as flushing liquid. Embodiments of the present invention are, naturally, applicable to for example double-acting mechanical seals, too. The mechanical seal 18 is used for sealing the shaft 14 of, for instance, a flow machine 16, e.g. a centrifugal pump, agitator, mixer or alike. The mechanical seal 18 is configured such that the interior of the flow machine, generally at the left hand side of the seal 18 in FIG. 1, is kept fluidly separate from the atmosphere, generally at the right hand side of the seal 18. The mechanical seal is positioned in a seal chamber 20 disposed within a specific seal housing or within a casing cover 22 of the flow machine. Embodiments of the present invention are also applicable for other kinds of sealing in connection with rotatable shaft such as gland packing sealing.

The device 1 comprises a sealing monitoring system 10 which is arranged in connection with the seal 11 of the device. The sealing monitoring system 10 comprises a first liquid detector 40 arranged in connection with the flushing liquid system 32. In FIG. 1 the seal 11 is a mechanical seal which comprises a schematically and exemplarily illustrated single-acting mechanical seal 18 arranged between the rotatable shaft 14 and a stationary seal housing 22. The sealing monitoring system 10 is configured to be suitable for detecting the operation and condition of the mechanical seal 11 comprising a flushing liquid system and the sealing. The first liquid detector 40 is configured to detect the presence of the flushing liquid in the flushing liquid system 32. In FIG. 1 there is depicted a first liquid detector 40 which can be disposed in either or both the seal chamber 20 itself and in a conduit opening into the seal chamber 20. This should be understood so that the actual location of the first liquid detector can vary depending on the embodiment as long as it is located such that the present status of the flushing liquid adjacent to the mechanical seal 18 can be detected or determined in a reliable manner. The flushing liquid can be a water based solution, advantageously water, in which embodiment the liquid detector is a water detector.

The sealing monitoring system 10 according to the embodiment of illustrated in FIG. 1 comprises a body or a casing 12 which houses at least some of the components belonging to the sealing monitoring system 10. The casing together with its components can be referred to also as a node and therefore the reference number 12 is also used for denoting the node. The node can include a predetermined sensor as is the case in FIG. 1. The node 12 of the sealing monitoring system 10 comprises a wireless data communication system 36 by which the data generated by a data processing apparatus 34 provided in the node 12 and/or the sensors connected to the node 12 can be transmitted for further processing, such as to a data storage, a user console, a cloud service or a like. The data can be utilized for general monitoring of operation of the device 1 or sending process data, such as alerts etc. to a mobile device of an operator of the device 1. The node 12 is an independent unit which comprises at least the first liquid detector 40, the data processing apparatus 34. The node 12 is removably and firmly attached to the seal housing 22 of the device 1. The sealing monitoring system 10 comprises data processing apparatus 34 or a system such as a microprocessor or alike, which is configured to receive data from the first liquid detector 40, which comprises a sensor. The data processing apparatus 34 comprises an executable computer program i.e. executable instructions which, when executed by the data processing apparatus, cause the sealing monitoring system 10 to carry out the method disclosed herein.

The data processing apparatus 34 of the node 12 is configured to receive data from the first liquid detector 40 to determine the presence status of flushing liquid. The wireless data communication system 36 is in data transfer connection with the data processing apparatus 34 in the node 12. The wireless data communication system 36 makes it possible for the sealing monitoring system 10 to communicate wirelessly with auxiliary devices and this way provide communication also to the internet. The sealing monitoring system 10 according to a preferred embodiment of the invention comprise a dedicated electric energy storage 33, such as a battery or rechargeable accumulator. The energy storage 33 provides power for operating the components of and optionally connected to the sealing monitoring system 10. The electric storage 33 has a capacity of providing energy for operating the sealing monitoring system 10 over a time period of several months without connection to a main power source. Even if the energy storage 33 is shown in only some of the figures it is provided in the sealing monitoring system 10 shown in other figures as well. The data processing apparatus 34 comprises executable instructions to detect the first flushing liquid presence status of the flushing liquid system 32, which can be performed using a first detecting interval. Advantageously the computer program comprises executable instructions to determine data transmission interval of the node 12 which is used to forward the first flushing liquid presence status for further processing. The first data transmission interval is based on the first flushing liquid presence status. According to the invention the computer program comprises executable instructions to detect the first flushing liquid presence status of the flushing liquid system 32, and executable instructions to determine the first flushing liquid presence status to be either affirmative when the presence of the flushing liquid in the flushing liquid system 32 is detected, or negative when the presence of the flushing liquid in the flushing liquid system 32 is not detected, and further executable instructions to transmit the first flushing liquid presence status for further processing using the wireless data communication system 36 with a first data transmission interval in case the flushing liquid presence status is affirmative, and executable instructions to transmit the first flushing liquid presence status for further processing using the wireless data communication system 36 with a second data transmission interval being shorter than the first transmission interval between the transmissions, when the flushing liquid presence status is negative.

This way it is possible to operate the sealing monitoring system 10 such that when the first flushing liquid presence status is affirmative the first flushing liquid presence status is transmitted to a further processing using a wireless data communication system 36 less frequently than when the first flushing liquid presence status is negative which in turn saves or decreases energy consumption of the node 12 and the charging interval or changing the interval of the energy storage 33 is increased.

In other words the computer program comprises executable instructions to determine a transmission interval based on the first flushing liquid presence status, such that the transmission interval is shorter when the first flushing liquid presence status is negative i.e. the flushing liquid is not detected in the flushing liquid system 32. The node 12 is advantageously a standalone device which advantageously includes a dedicated power source such as a battery or an accumulator 33. The node 12 being a standalone device is made possible by the energy storage 33 such as a battery or an accumulator.

According to an embodiment of the invention the executable instructions, when executed, set the second data transmission interval to be less than 60 seconds. This way, when the first flushing liquid presence status is negative, the status is updated frequently.

In order to minimize the energy consumption of the sealing monitoring system 10 advantageously the data processing apparatus comprises executable instructions to set the wireless data communication system 36 to idle between the transmissions. Thus, when the flushing liquid presence status is affirmative the status information is transmitted further only rarely, which further decreases energy consumption of the sealing monitoring system 10 and prolongs the available service period of the energy storage 33 (with one charge if rechargeable).

According to an aspect of the invention the data processing apparatus comprises executable instructions to transmit the first flushing liquid presence status for further processing using the wireless data communication system 36 with the first data transmission interval being more than one hour, when the flushing liquid presence status is affirmative.

According to a further aspect of the invention the data processing apparatus comprises executable instructions to transmit the first flushing liquid presence status with the first data transmission interval being more than 4 hours.

According to a further aspect of the invention the data processing apparatus comprises executable instructions to transmit the first flushing liquid presence status with the first data transmission interval being infinite. In other words according to this aspect when the flushing liquid presence status is affirmative the computer program in the data processing apparatus 34 comprises executable instructions to never transmit—or not to transmit—the first flushing liquid presence status, until the flushing liquid presence status is changed to negative. In this embodiment the data transmission is self-activating such the computer program in the data processing apparatus 34 comprises executable instructions to detect the first flushing liquid presence status in the flushing liquid system by the first liquid detector, and if the first flushing liquid presence status is turned to negative (no liquid status detected), to commence transmission of the first flushing liquid presence status for further processing and to keep transmitting using the wireless data communication system 36 with a data transmission interval of less than 60 seconds. This way the information of lack of flushing liquid is obtained without undue delay and the service period of the energy storage 33 is simultaneously obtained.

The first liquid detector 40 can be configured or constructed to detect presence of flushing liquid intermittently. In such an embodiment the data processing apparatus 34 of the node 12 comprises executable instructions to detect the first flushing liquid presence status using the first detecting interval in case the first flushing liquid presence status is affirmative, and executable instructions to detect the first flushing liquid presence status using a second detecting interval being shorter than the first detecting interval in case the first flushing liquid presence status is negative. In other words the presence of the liquid is detected more often if, based on the signal of the liquid detector, there is not liquid present in the flushing liquid system 32. The first detecting interval is thus adopted when the first flushing liquid presence status is affirmative.

A sealing monitoring system 10 according to an embodiment of the invention first liquid detector 40 is configured to detect presence of flushing liquid continuously.

Figure 2:
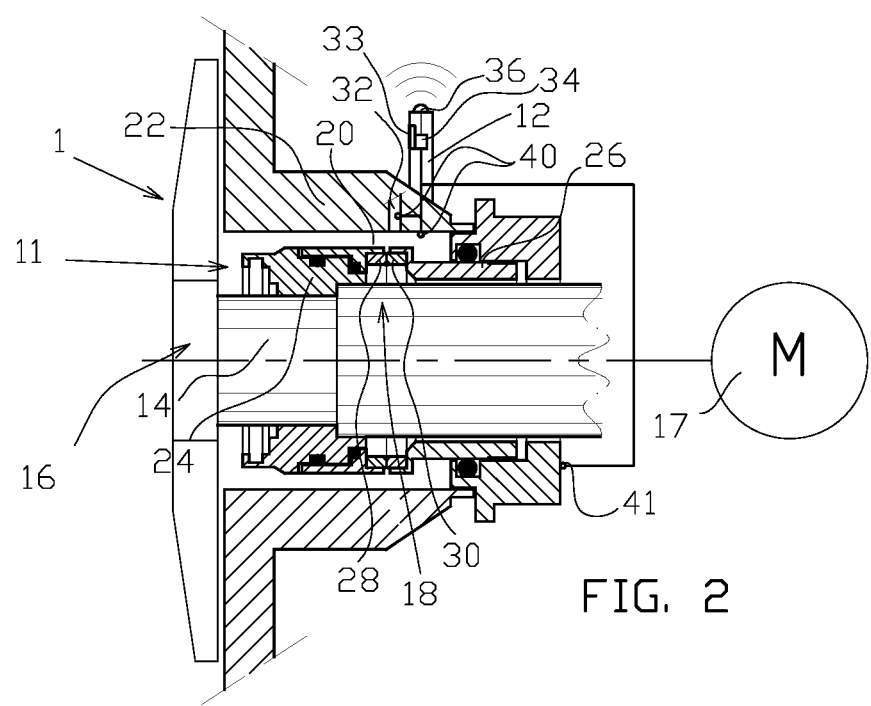
FIG. 2 illustrates a sealing monitoring system for a mechanical seal according to another embodiment of the invention.

FIG. 2 shows schematically an embodiment of the invention according to which the sealing monitoring system 10 shown in the FIG. 1 has an additional, optional feature which brings about an additional functionality to the device 1 and the sealing monitoring system 10. Namely, the sealing monitoring system 10 comprises the first liquid detector 40 as is disclosed in the FIG. 1 and additionally a second liquid detector 41. The second liquid detector 41 is configured to detect presence of liquid outside the flushing liquid system 32. As can be seen in FIG. 2 the second liquid detector 41 is arranged in a vicinity of an opening 13 for the shaft 14 in the housing 22 of the device 1. According to the embodiment of FIG. 2 the data processing apparatus 34 in the node 12 is configured to receive data of the second liquid detector 41 as well, such that the data processing apparatus comprises executable instructions to detect the second flushing liquid presence status outside the flushing liquid system by the second liquid detector 41. The data processing apparatus comprises executable instructions to determine the second flushing liquid presence status to be either affirmative when the presence of the flushing liquid outside the flushing liquid system is detected, or negative when the presence of the flushing liquid outside the flushing liquid system is not detected, and executable instructions to transmit the second flushing liquid presence status for further processing using the wireless data communication system 36 with the second data transmission interval in case the second flushing liquid presence status is affirmative. If the second flushing liquid presence status is affirmative there is a leak in the sealing and the data transmission interval is at least shorter than the first data transmission interval. In FIG. 2 the second liquid detector 41 is mechanically connected i.e. wired, in data transfer communication to the common data processing apparatus 34 and the wireless data communication system 36 with the first liquid detector 40 in the node 12. The second liquid detector 41 can also include a wireless data communication system 36, as is depicted in the FIG. 3 by which the data transfer communication with the node 12 is accomplished in wireless manner.

Figure 4:
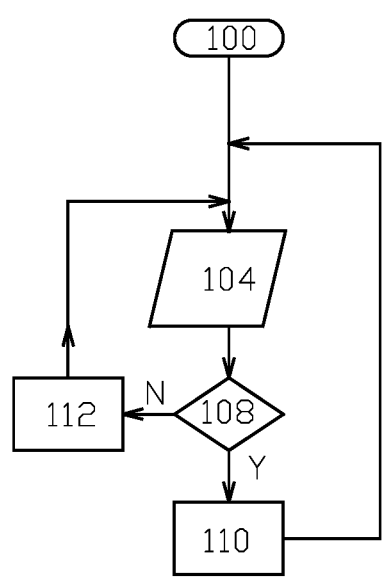
FIG. 4 illustrates a flowchart of a method according to an embodiment of the invention.

The sealing monitoring system 10 according to embodiments of the invention can be employed to any mechanical seal for a rotatable shaft, and operated by practicing at least the following steps. Firstly a seal 11, which includes a flushing liquid system 32, is arranged between a rotatable shaft and a stationary housing 22. The mechanical seal 11 includes a first liquid detector 40 and the first liquid detector 40 is configured to detect the presence of flushing liquid in the flushing liquid system 32. With a reference to FIG. 4 showing a flowchart of a method according to an embodiment of the invention using an intermittently practiced liquid detection, the sealing monitoring system 10 is operated after each start 100 of the device 1 by a procedure controlled by execution of the computer program in the data processing apparatus 34. At first the first flushing liquid presence status in the flushing liquid system 32 is detected 104 by the first liquid detector 40, and subsequently in the step 108 is it deduced whether the first flushing liquid presence status is affirmative or negative i.e. if the liquid is detected or not.

When the first flushing liquid presence status is affirmative Y, in the step 110 the first flushing liquid presence status is transmitted to a further processing using a wireless data communication system 36 with a first data transmission interval. Now, since the liquid is present, the situation is normal and the first data transmission interval can be set or maintained to be substantially long, or in some cases the data transmission can be totally omitted until the first flushing liquid status is detected to be negative. According to an embodiment of the invention the first data transmission interval is more than one hour, advantageously even more than 4 hours. In some cases the first data transmission interval is infinite, meaning that data transmission is halted if the first flushing liquid presence status is affirmative. This procedure reduces energy consumption of the device considerably, since mere liquid detection consumes only minimal amount of energy. Next the control is returned to the step 104 such that the first flushing liquid presence status in the flushing liquid system 32 is detected again.

Optionally, in order to decrease energy consumption of the sealing monitoring system, according to an embodiment of the invention the wireless data communication system 36 can be set to idle between each data transmission.

When it is deduced in the step 108 that the first flushing liquid presence status is negative N i.e. the liquid is not detected, in the step 112 the first flushing liquid presence status is immediately transmitted to a further processing using the wireless data communication system 36. Advantageously in the step 112 the wireless data communication system 36 is set to transmit the first flushing liquid presence status with a second data transmission interval which is shorter than the first data transmission interval, which second data transmission interval is advantageously less than 60 seconds.

Now turning back to FIG. 3 the mechanical sealing can include a second liquid detector 41 outside the mechanical sealing housing as in FIG. 2, but the second liquid detector 41 further comprises a wireless data communication system 36' by which the data generated by the data processing apparatus 34' of the first liquid detector 40 can be transmitted via the node 12 for further processing, such as to a data storage, a user console, a cloud service or a like. Also the second liquid detector 41 comprises a dedicated electric energy storage 33, such as a battery or rechargeable accumulator. The energy storage 33 provides power for operating second liquid detector 41. The electric storage 33 comprises a capacity of providing energy for operating second liquid detector 41 over a time period of several months.

The data can be utilized for general monitoring of operation of the device 1 or sending process data, such as alerts etc. to a mobile device of an operator. The second liquid detector 41 is configured to detect presence of flushing liquid outside the flushing liquid system, and a second flushing liquid presence status outside the flushing liquid system is detected by means of the second liquid detector 41 When the second flushing liquid presence status is affirmative, the second flushing liquid presence status to a further processing. When the first flushing liquid presence status is affirmative and the second flushing liquid presence status is affirmative it is known that the mechanical seal is leaking.

Figure 3:
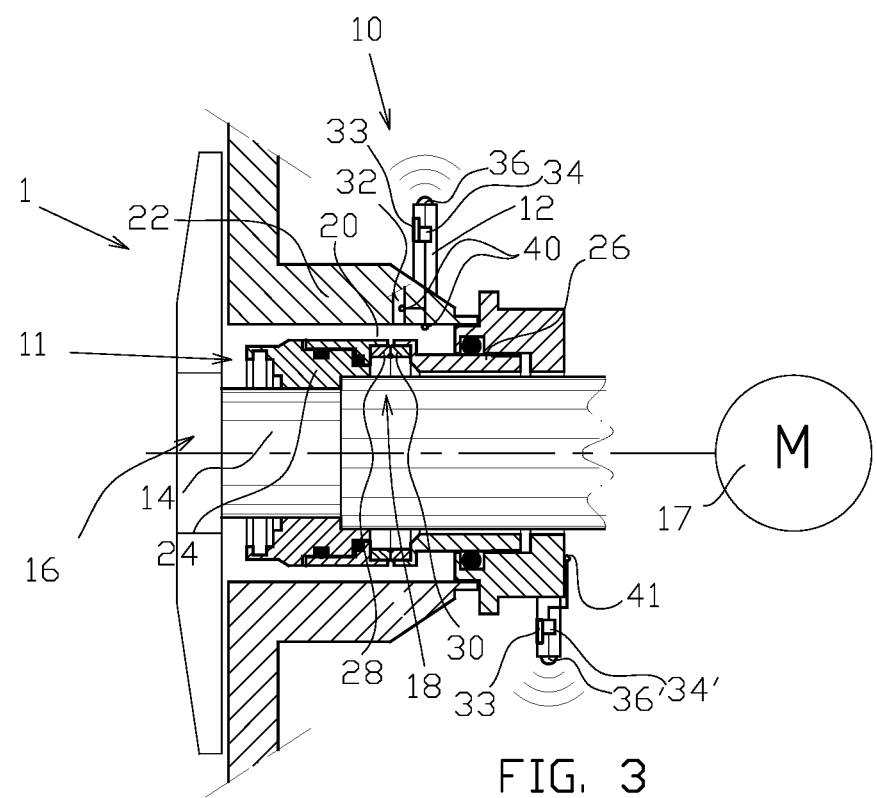
FIG. 3 illustrates a sealing monitoring system for a mechanical seal according to still another embodiment of the invention.

The second liquid detector 41 comprises a dedicated data processing apparatus or system, such as a microprocessor 34' or the like, which is configured to control the operation of the second liquid detector 41 and its data communication to the node 12. The second liquid detector 41 is advantageously a standalone device which is advantageously provided with a dedicated power source such as a battery or an accumulator. In the embodiment of FIG. 3 the second liquid detector is operated such that the second flushing liquid presence status outside the flushing liquid system 32 is detected by the second liquid detector 40, and when the second flushing liquid presence status is negative, the second flushing liquid presence status is transmitted to a further processing using a wireless data communication system 36' with the first data transmission interval between the transmissions, and when the first flushing liquid presence status is affirmative, the second flushing liquid presence status is transmitted for further processing using the wireless data communication system 36' with the second data transmission interval being shorter than the first transmission interval between the transmissions. The second flushing liquid presence status is transmitted to a further processing via the node 12.

Figure 5:
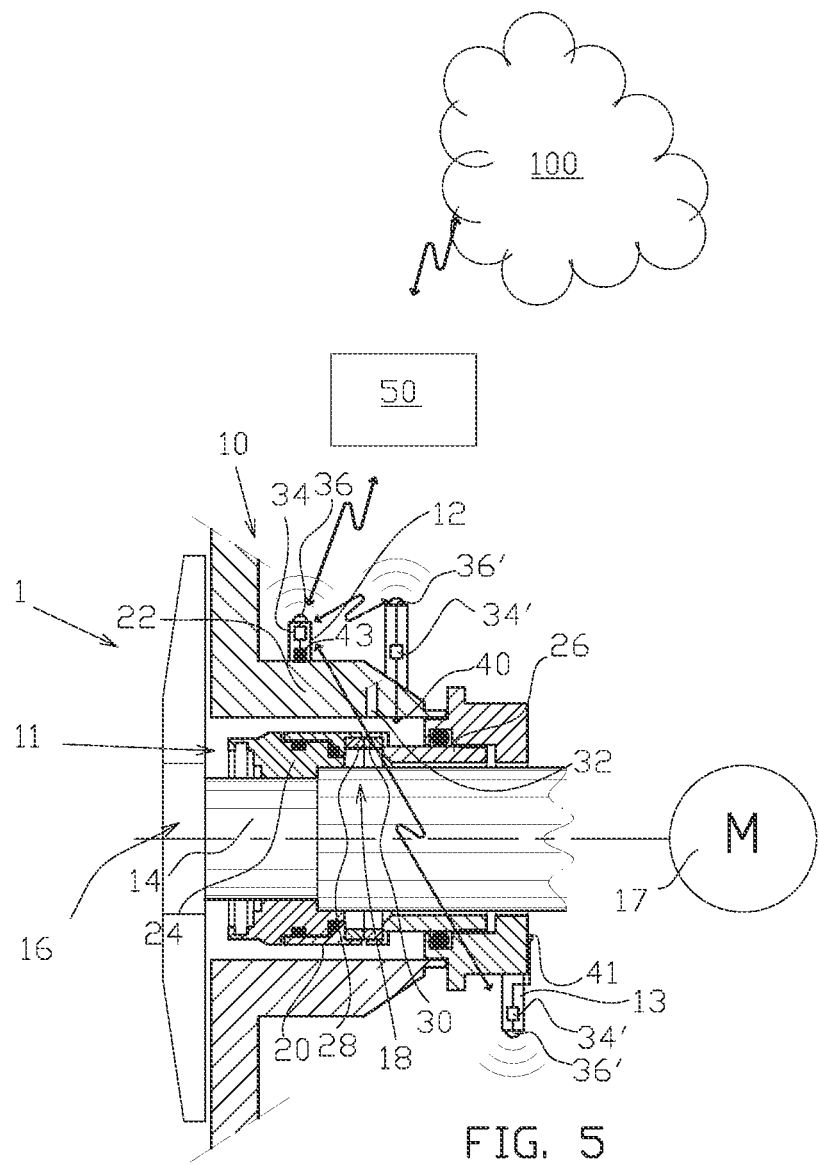
FIG. 5 illustrates a sealing monitoring system for a mechanical seal according to still another embodiment of the invention.

FIG. 5 shows schematically an advantageous embodiment of the invention which compared to the sealing monitoring system 10 shown in FIG. 1 has additional features and elements which brings about additional functionalities of the device 1 and the sealing monitoring system 10. The sealing monitoring system 10 according to the embodiment of FIG. 5 comprises the first liquid detector 40 configured to detect the presence of liquid inside the flushing liquid system 32, an optional second liquid detector 41 configured to detect the presence of liquid outside the flushing liquid system 32 and further a vibration sensor unit 43. The first and the second liquid detector comprise a dedicated data processing apparatus or system 34', such as a microprocessor or the like, which is configured to control the operation of the first liquid detector 40, and respectively the second liquid detector 41 and their data communication. The vibration sensor unit 43 is configured to detect the vibration intermittently and the vibration is detected using the first detecting interval when the first flushing liquid presence status is affirmative, and the vibration is detected using a second detecting interval being shorter than the first detecting interval when the first flushing liquid presence status is negative. The detection interval used for detecting the vibration need not to be identical to the first or the second interval used for detecting the first or the second flushing liquid presence status.

When the sealing monitoring system 10 includes the first and the second liquid detectors 40, 41 the system can be operated such that when the liquid detection system results in a decision that the first flushing liquid presence status and the second flushing liquid presence status are both affirmative at the same time, it can be concluded that operation, for example dry operation, has caused a failure to the sealing. This information can be used to trigger a transmission of an alarm signal.

The vibration sensor unit 43 comprises e.g. one or more acceleration sensors configured to detect vibration of the device 1 in one or more directions. As can be seen in FIG. 5 the second liquid detector 41 is arranged in a vicinity of an opening 13 for the shaft 14 arranged in the housing 22 of the machine for detecting liquid possible leaked through the sealing 18. The vibration sensor unit 43 is firmly attached to the body 22 of the device 1 such that the vibration of the device 1 can be determined when the device is running.

The sealing monitoring system 10 comprises a node 12 into which, in this embodiment of the invention, the vibration sensor unit 43 is arranged. The node 12 also includes a data processing apparatus 34 which has the executable instructions to control the operation of the node 12 such that the method defined in the appended method claims can be implemented into practice. The first liquid detector 40 and the second liquid detector 41 are configured into wireless data transmission communication with the node 12. The node 12 is configured to function as a centralized data transmission link between the first liquid detector 40 and a gateway 50 to the internet 100, and the second liquid detector and the gateway 50 to the internet 100 for connecting the sealing monitoring system 10 to the internet 100 in centralized manner. The data processing apparatus 34 of the node 12 comprises executable instructions to relay data from the first liquid detector 40 and the second liquid detector 41 to the internet 100 and further to a predetermined destination for further processing the data.

According to the embodiment of FIG. 5 the data processing apparatus 34 of the node 12 is configured to receive data of the first liquid detector 41 and to receive data of the optional second liquid detector 41, such that the data processing apparatus comprises executable instructions to detect the first flushing liquid presence status inside the flushing liquid system, by the first liquid detector 40. In addition to detecting the first flushing liquid presence status, the sealing monitoring system 10 is configured to read and process data from the vibration sensor unit 43. The data of vibration signal is used for determining whether the device 1 is running or not. That can be detected by using either time domain or frequency domain of the vibration signal, obtained for example the Fast Fourier Transform (FFT). According to an embodiment of the invention the time stamp of the moment of start of the device 1 is detected by analysis of the data of vibration signal and the first flushing liquid presence status is detected at the moment of start of the device 1. This way it is possible to check and/or confirm that the flushing liquid system is operating at the moment of start of the device 1.

In the sealing monitoring system 10 disclosed in FIG. 5 the first liquid detector 40 is operated such that the first flushing liquid presence status inside the flushing liquid system 32 is detected by means of the first liquid detector 40. When the first flushing liquid presence status is affirmative, the first flushing liquid presence status is transmitted to a further processing using a wireless data communication system 36' with the first data transmission interval between the transmissions, and when the first flushing liquid presence status is negative, the first flushing liquid presence status is transmitted for further processing using the wireless data communication system 36' with the second data transmission interval being shorter than the first transmission interval. The first flushing liquid presence status is transmitted to a further processing via the node 12.

In turn, the second liquid detector 41 is operated such that the second flushing liquid presence status outside the flushing liquid system 32 is detected by the second liquid detector 41. When the second flushing liquid presence status is negative, the second flushing liquid presence status is transmitted for further processing using a wireless data communication system 36' with the first data transmission interval between the transmissions, and in case the first flushing liquid presence status is affirmative, the second flushing liquid presence status is transmitted for further processing using the wireless data communication system 36' with the second data transmission interval being shorter than the first transmission interval between the transmissions. The second flushing liquid presence status is transmitted to a further processing also via the node 12.

The transmission interval of the data, including the vibration information the first flushing liquid presence status and/or the second flushing liquid presence status, from the node 12 for further processing is determined advantageously by means of flushing liquid presence status in the following manner. The transmission interval for the data is longer i.e. the first transmission interval used when either the first flushing liquid presence status is affirmative or the second flushing liquid presence status is negative, and the transmission interval for the data is shorter i.e. the second transmission interval used when either the first flushing liquid presence status is negative or the second flushing liquid presence status is affirmative.

Even if not shown in the figures the data processing apparatus and the wireless data communication system 36 may be integrated into a one data processing unit. The wireless transmitting means or system like Bluetooth, Wi-Fi or generally radio frequency transmitting means or system, just to name a few optional systems without any intention to limit the invention to the listed alternatives.

While embodiments of the invention have been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such combination is technically feasible.

The invention claimed is:

1. A method of operating a sealing monitoring system for a seal of a rotatable shaft including a flushing liquid system the seal being disposed between the rotatable shaft and a stationary housing, the sealing monitoring system including a liquid detector configured to detect a presence of a flushing liquid in the flushing liquid system, the method comprising:
    detecting a flushing liquid presence status in the flushing liquid system with the liquid detector;
    transmitting the flushing liquid presence status intermittently for processing, at least one of a first data transmission interval or a second data transmission interval occurring between transmissions of the transmitting the flushing liquid presence status intermittently,
    when the flushing liquid presence status is affirmative,
    the transmitting the flushing liquid presence status includes transmitting the flushing liquid presence status for the processing using a wireless data communication system with the first data transmission interval between the transmissions; and
    when the flushing liquid presence status is negative,
    the transmitting the flushing liquid presence status includes transmitting the flushing liquid presence status for processing using the wireless data communication system with second data transmission interval, which is shorter than the first data transmission interval, between the transmissions.

2. The method of operating the sealing monitoring system according to claim 1, wherein the wireless data communication system is set to idle at least one of a first data transmission interval or a second data transmission interval occurring between the data transmissions.

3. The method of operating the sealing monitoring system according to claim 1, wherein when the flushing liquid presence status is affirmative, the first data transmission interval is more than one hour.

4. The method of operating the sealing monitoring system according to claim 1, wherein when the flushing liquid presence status is negative, the second data transmission interval is less than 60 seconds.

5. The method of operating the sealing monitoring system according to claim 1, wherein the liquid detector is a first liquid detector, the flushing liquid is a first flushing liquid, and the sealing monitoring system includes a second liquid detector outside the housing configured to detect presence of a second flushing liquid presence status outside the flushing liquid system, and when the second flushing liquid presence status is affirmative, transmitting the second flushing liquid presence status for processing.

6. The method of operating the sealing monitoring system according to claim 1, wherein the sealing monitoring system includes a vibration sensor unit, the method comprising detecting vibration information of the rotatable shaft of the device, and determining rotation status of the rotatable shaft from the vibration information and when the flushing liquid presence status is affirmative, transmitting the vibration information for processing using the first data transmission interval between the transmissions, when the flushing liquid presence status is negative, transmitting the vibration information for processing using the second data transmission interval between the transmissions.

7. The method of operating the sealing monitoring system according to claim 1, wherein the flushing liquid system comprises a node to which the flushing liquid presence status is transmitted using the wireless data communication system and the flushing liquid presence status is transmitted from the node for processing using the wireless data communication system.

8. A sealing monitoring system for a seal in an apparatus comprising a rotatable shaft, a flushing liquid system, the seal being arranged between the rotatable shaft and a housing, the sealing monitoring system comprising:

a liquid detector configured to detect presence of a flushing liquid in the flushing liquid system;

a data processing apparatus configured to receive data of the liquid detector; and a wireless data communication system in data transfer connection with the data processing apparatus, the data processing apparatus comprising executable instructions to detect a flushing liquid presence status of the flushing liquid system, executable instructions to determine a first flushing liquid presence status to be either affirmative when the presence of the flushing liquid in the flushing liquid system is detected, or negative when the presence of the flushing liquid in the flushing liquid system is not detected, the data processing apparatus further comprising executable instructions to transmit the flushing liquid presence status intermittently for processing, at least one of a first data transmission interval or a second data transmission interval occurring between transmissions of the transmitting the flushing liquid presence status intermittently, the executable instructions to transmit the flushing liquid presence status includes transmitting the flushing liquid presence status for processing using the wireless data communication system with the first data transmission interval when the flushing liquid presence status is affirmative, and the executable instructions to transmit the flushing liquid presence status includes transmitting the flushing liquid presence status for processing using the wireless data communication system with the second data transmission interval, which is shorter than the first data transmission interval between the transmissions, when the flushing liquid presence status is negative.

9. The sealing monitoring system according to claim 8, wherein the liquid detector is configured to detect presence of the flushing liquid intermittently.

10. The sealing monitoring system according to claim 8, wherein the liquid detector is configured to detect a presence of the flushing liquid continuously.

11. The sealing monitoring system according to claim 8, wherein the data processing apparatus comprises executable instructions to set the wireless data communication system to idle during the at least one of a first data transmission interval or a second data transmission occurring between the transmissions.

12. The sealing monitoring system according to claim 8, wherein the data processing apparatus comprises executable instructions to transmit the flushing liquid presence status for processing using the wireless data communication system with the first data transmission interval being more than one hour when the flushing liquid presence status is affirmative.

13. The sealing monitoring system according to claim 8, wherein the data processing apparatus comprises executable instructions to set the second data transmission interval to less than 60 seconds.

14. The sealing monitoring system according to claim 8, further comprising a node configured to communicate with a gateway to an internet, and the liquid detector is configured to communicate with the node.

15. The sealing monitoring system according to claim 14, wherein the liquid detector is a first liquid detector and sealing monitoring system comprises a second liquid detector configured to detect presence of liquid outside the flushing liquid system and the second liquid detector is configured to communicate with the node and the node is configured to communicate with a gateway to an internet and transfer data obtained by the first liquid detector and the second liquid detector to the gateway.

\* \* \* \* \*